United States Patent Office 3,376,507
Patented Apr. 2, 1968

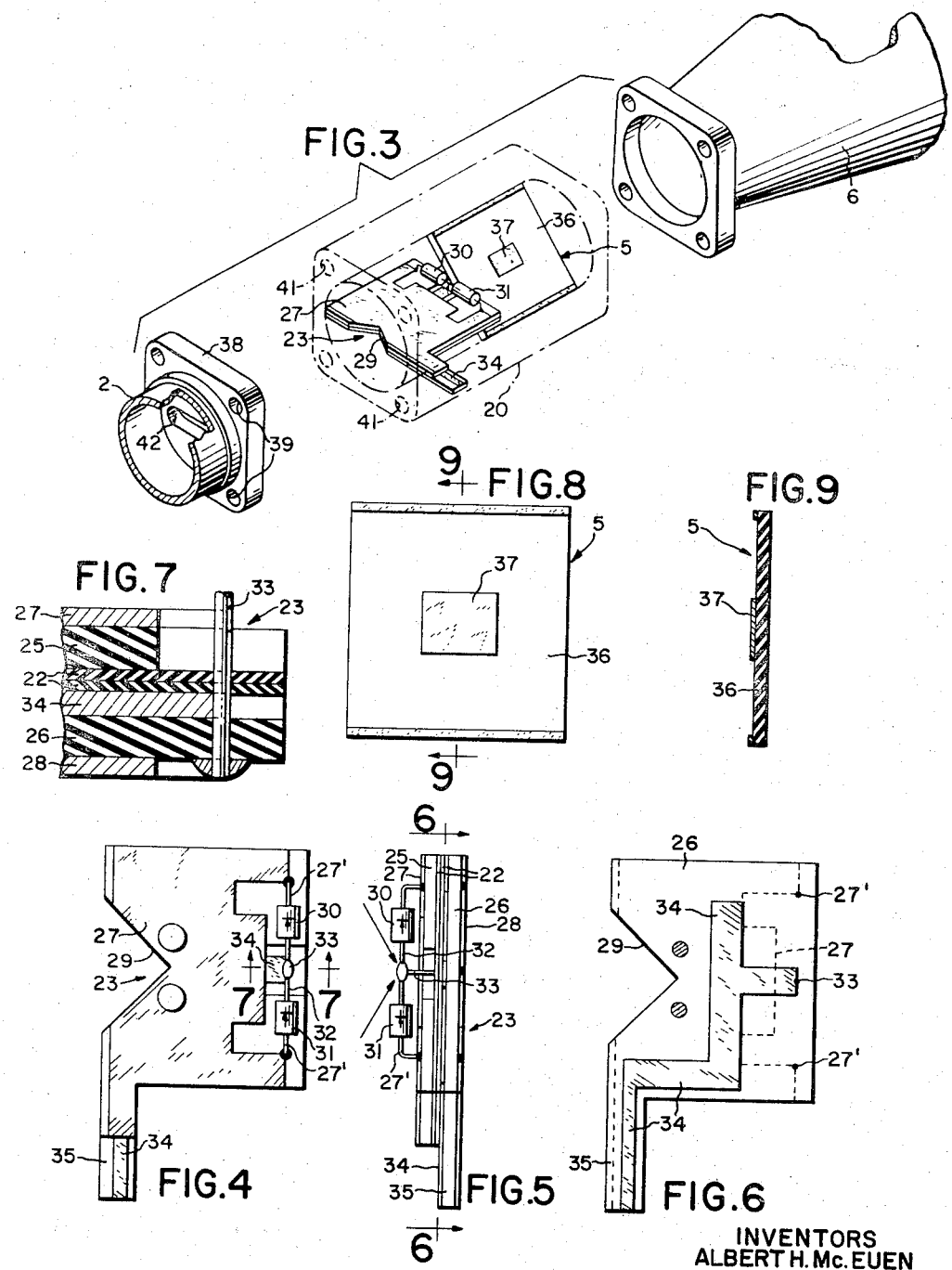

3,376,507
BALANCED MICROWAVE HYBRID
FUNCTION MIXER ASSEMBLY
Albert H. McEuen, Saratoga, Richard M. Whitehorn, Menlo Park, Robert E. Dye, Campbell, and Edward J. Murphy, Los Altos Hills, Calif., assignors to Varian Associates, Palo Alto, Calif., a corporation of California
Original application Jan. 8, 1962, Ser. No. 164,892, now Patent No. 3,270,339, dated Aug. 30, 1966. Divided and this application June 27, 1966, Ser. No. 590,111
3 Claims. (Cl. 325—446)

ABSTRACT OF THE DISCLOSURE

A CW Doppler radar intruder alam system is disclosed. The radar employs a balanced mixer-duplexer for sending and receiving the radar signals. The balanced mixer-duplexer includes a section of waveguide capable of supporting two orthogonal modes. The transmitted signal, propagating in one of the orthogonal modes, passes through the section of waveguide and a quarter wave plate for circularly polarizing the output signal. The return echo signal passes through the quarter wave plate for changing the orientation of the polarization of the received signal to a polarization orthogonal to the transmitted signal. The section of waveguide containing the two orthogonal modes includes a printed circuit board forming a conductive septum. The septum is disposed with the plane of the septum normal to the polarization of the transmitted signal. A pair of rectifying diodes are disposed above the plane of the conductive septum and are connected such that a small portion of the transmitted signal is coupled into the diodes. On the other hand, the diodes are connected to be collinear with the polarization of the returned echo signal. The diodes are connected such that the two orthogonal modes are coupled in-phase into one of the diodes and in out-of-phase relation into the other diode to obtain balanced mixer operation. The beat frequency output of the balanced mixer is coupled through the printed circuit board to an output to be used for detection of intruders.

---

Figure 1:
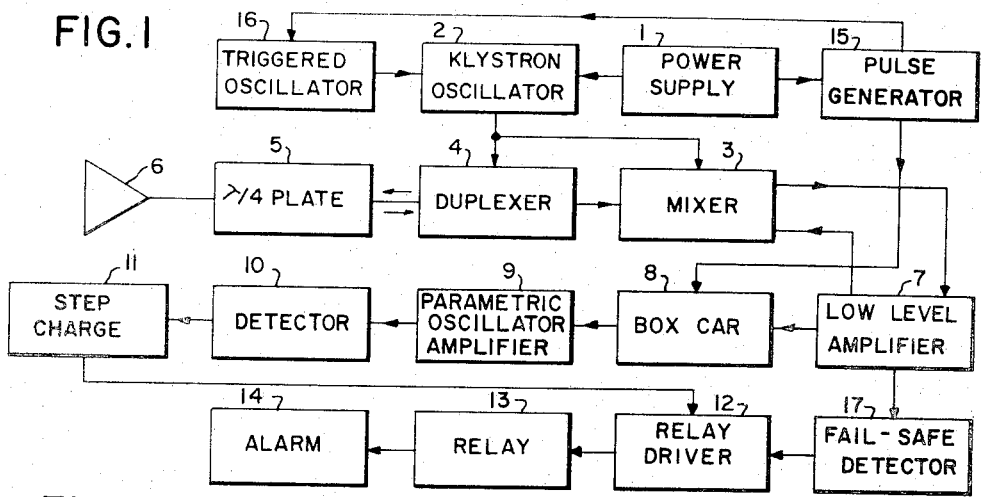

The present application is a divisional application divided out of parent application Ser. No. 164,892 filed Jan. 8, 1962, now issued as U.S. Patent 3,270,339 on Aug. 30, 1966, and assigned to the same assignee as the present invention.

Known electronic intruder alarm systems can be grouped generally into two classes. The first class would include "disturbed field" devices which produce an electric field in or around an area to be protected. A sensitive receiver is used in conjunction with the transmitter to receive and measure the electric field. A variation in the electric field strength will result if an intruder or foreign object disturbs the electric field by entering within the field. This field variation may be easily detected by the receiver and used to trigger an indicator or alarm system.

The second class of electronic personnel detection devices would include those devices which transmit wave energy at a known CW frequency and compare the known transmitted frequency with the frequency of the wave energy reflected from persons or objects moving within the area being monitored. Any frequency change of the reflected wave energy, as compared to the transmitted energy, will indicate an object is moving within the area being monitored. This is the principle of operation of the well-known "Doppler" effort.

There are many variances and modifications on the above-named classes of detection devices. For example, the well-known "electric eye" or photoelectric circuit, detects an object crossing and blocking its beam path. The blocking objects stops current flow from a light sensitive cell of the circuit, and this may be used to activate any number of desired functions.

The above-named intruder alarm systems have limitations or drawbacks. For example, the first-named "disturbed field" devices must have their receivers carefully and frequently adjusted and they must be readjusted whenever any new object is placed in the area being monitored, as a new object will cause a field variance. Often, two balanced receivers are used when larger areas are being monitored and these must be re-balanced regularly to insure proper operation of the system.

Doppler devices, which were previously used at sonic or ultrasonic frequencies, have drawbacks in that expensive transducers are needed to convert electrical energy to sonic energy and back again to electrical energy through receiving transducers. Complicated and expensive switching devices are also needed for operating the sonic Doppler system as a single transmit-receiver transducer.

Low frequency electromagnetic Doppler devices have only a limited use in monitoring enclosed areas such as rooms, halls, etc., as low frequency electromagnetic wave energy will penetrate most wall surfaces and, therefore, will be unable to differentiate between movement in the area being monitored and movement in the surrounding area, for example, the next room, without the use of expensive shielding to reflect the low frequency electromagnetic energy.

Another drawback to many Doppler types of intrusion detectors (either sonic, supersonic, or electromagnetic) is the need for expensive and complex systems utilizing separate transmit and receive antennas or, if a single antenna is used, expensive duplexers are needed to protect the receiver from damage by the high power signal being transmitted.

It is the object of the present invention to provide a high frequency CW electromagnetic wave energy intruder alarm system whereby persons and objects moving in a predetermined area reflect frequency modulated wave energy signals which may be detected to announce the presence of said persons and/or objects.

One feature of the present invention is the use of a novel balanced mixer-duplexer assembly supported on a low-loss printed circuit card which is relatively inexpensive to manufacture and easy to assemble.

Another feature of the present invention is a novel orthogonal mode microwave hybrid junction wherein the junction connections are disposed in regions such that a straight-line joining said regions is spaced from the axis of the waveguide.

Another feature of the present invention is a novel microwave hybrid waveguide junction including a septum plane member disposed in the waveguide wherein the junction connections are disposed out of the plane of the septum.

Another feature of the present invention is a novel λ/4 (quarter-wave) plate used in combination with the above-mentioned mixer-duplexer which is supported on a low-loss printed circuit card and is relatively inexpensive to manufacture and easy to assemble.

Figure 2:
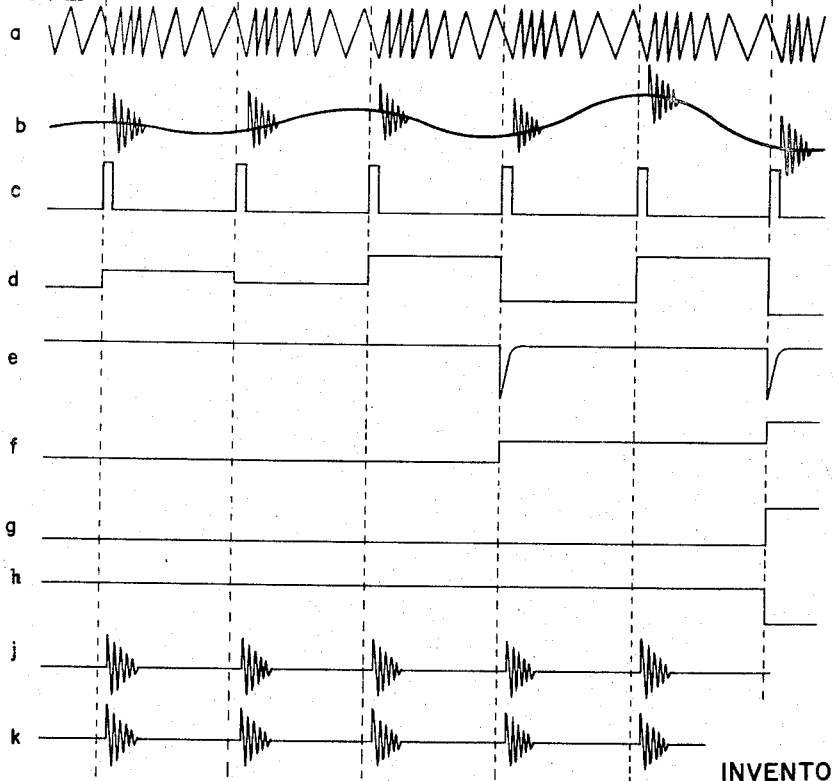

Other features and advantages of the present invention will become apparent upon a perusal of the following specification taken in connection with the accompanying drawings wherein:

FIG. 1 is a block diagram of a high frequency intruder alarm system in accordance with the present invention, FIG. 2, a–k, are a series of waveforms taken at different points throughout the intruder alarm system showing the electrical relation between given points in the system, FIG. 3 is an exploded perspective view showing the output of a klystron, the waveguide section, and a portion of the antenna horn, all in accordance with the present invention, FIG. 4 is a plan view of a balanced mixer-duplexer in accordance with the present invention, FIG. 5 is a right-hand side view of FIG. 4, FIG. 6 is a cross-sectional view of FIG. 5 taken at line 6—6 in the direction of the arrows, FIG. 7 is an enlarged fragmentary cross-sectional view of FIG. 4 taken at line 7—7 in the direction of the arrows, FIG. 8 is a plan view of a λ/4 plate used in the present invention, and FIG. 9 is a cross-sectional view of FIG. 8 taken at line 9—9 in the direction of the arrows.

The novel intruder alarm system is shown in block diagram form in FIG. 1, and its associated waveforms shown in FIG. 2. The system comprises a power supply 1 for supplying the necessary power to the various components and circuits of the system, including a klystron oscillator 2. The klystron 2, for example, an X-band reflex klystron oscillator well known in the microwave art, produces a CW (continuous wave) frequency output directed into a predetermined area by an antenna 6, for example, a parabolic reflector or a horn type antenna. Waveform of FIG. 2a shows the CW wave output being frequency modulated at short, regular intervals. These frequency pulses are the fail-safe signals and will be explained shortly. A mixer 3, duplexer 4, and λ/4 plate 5 are positioned between klystron oscillator 2 and antenna 6 so that a single antenna may be used for both transmitting and receiving the electromagnetic wave energy signals.

The CW electromagnetic wave energy transmitted from antenna 6 is directed into the predetermined area to be monitored. If no objects or persons are moving within this area, the signal waves reflected back to the antenna are unmodulated. These unmodulated reflected signals will produce a known level signal from the balanced mixer 3 in a manner to be fully described subsequently.

An intruder, when moving through the transmitted electromagnetic wave, will reflect a frequency modulated wave back to the antenna, where the reflected frequency modulated signal is compared with the known frequency of the transmitted signal. An IF (intermediate frequency) signal, proportional to the difference frequency will be fed as pulsating D-C (FIG. 2b) to a low-level amplifier 7. Low-level amplifier 7 is provided with a degenerative feedback path containing a low-pass filter (D-C to approximately 1.5 c.p.s.). The D-C signal is fed back through the mixer 3 to provide a D-C input bias to the amplifier input to maintain a stable operating level for the amplifier.

The amplified D-C signal is fed to a "Boxcar" or pulse-stretching circuit 8. Boxcar circuit 8 samples the output from amplifier 7 at regular (60/sec.) intervals. An electronic switch, triggered by a short pulse width wave train, FIG. 2c, from pulse generator 15 controls the sampling. The sampled signal portions are stretched, by a long-time constant network, at a constant amplitude (FIG. 2d) until the next signal portion is sampled.

A novel parametric-oscillator-amplifier circuit 9 provides a high input impedance solid state amplifier to amplify the output signal from "Boxcar" circuit 8. The high input impedance is needed to maintain the long-time constant output of the pulse-stretcher circuit which is fed into the parametric-oscillator-amplifier 9. The amplified "step-pulse" signal from amplifier 9 (an amplified version of FIG. 2d) is fed to a detector 10 which produces negative spike pulses (FIG. 2e) whenever the amplified "step-pulse" output signal exceeds a given amplitude from one pulse to the next. The detector acts as a guard against slowly gradually rising increases from triggering the alarm.

Step-charge circuit 11 is controlled by the negative spikes produced by detector 10. As each negative spike (FIG. 2e) is fed into detector 10, an input switch associated therewith produces a positive charge (FIG. 2f) in circuit 11. Any chosen cause the positive charges to build up to a threshold (FIG. 2g) to overcome the cut-off bias on a relay driver 12 which will, in turn, remove current (FIG. 2h) from relay 13 to activate alarm 14, for example, a bell, or a light or any other type of alarm desired. The number of negative pulses chosen above is determined by the degree of sensitivity desired as balanced against susceptibility of the system to false alarms.

A novel fail-safe system has been incorporated in the present radar device to insure maximum vigilance and reliance of the system. Power supply 1 supplies a 60 cycle signal to a synchronous pulse generator 15 which generates 60 cycle pulse (FIG. 2c) of very short duration. The front side of the pulses (FIG. 2c) opens the switch of the Boxcar circuit and the back side of the pulses closes the switch, as described above. The pulse output from generator 15 is also fed to a triggered oscillator 16, triggered by the back side of the pulse generator output. Triggered oscillator 16 includes a low Q 4 kc. ringing circuit which decays at an exponential rate. The rapidly decaying oscillations from triggered oscillator 16 (FIG. 2j) are fed to the reflector of klystron 2. The variation in reflector potential causes a variation in frequency output (the fail-safe signal) from klystron 2 (FIG. 2a) as is well known. Since the frequency modulation is initiated timewise, on the back side of the pulse (FIG. 2c), the fail-safe signal will be blocked by the Boxcar circuit as the back side of the pulse opens the switch in the Boxcar. The fail-safe signal pulse (FIG. 2k) is fed, from amplifier 7 to fail-safe detector 17.

Fail-safe detector 17 includes a long-time constant circuit which provides a high potential bias signal that is recharged by the incoming fail-safe signal pulses. This high potential biases a detector to the off position. If the klystron ceases operation or fails in any manner, the detector would start to operate and produce an output signal which is fed to relay driver 12. This signal would cut off relay driver 12 and activate the alarm 14 as described above.

The balanced mixer-duplexer and λ/4 plate section, in accordance with the present invention, is best seen in FIGS. 3–9. A short cylindrical waveguide section 20 positioned between klystron 2 and a horn antenna 6 is formed by boring a rectangular block. Two pairs of opposing grooves are provided, as by machining, in the inner wall of waveguide 20. One pair of grooves is positioned such as to support a mixer-duplexer card 23 at the input or klystron end of waveguide 20. The second pair of grooves supports a λ/4 plate card 5 at the output end of waveguide 20 rotated 45° with respect to mixer-duplexer card 23.

Mixer-duplexer card 23 (best seen in FIGS. 3 to 7) comprises a pair of low-loss printed circuit boards 25 and 26, having their joining sides coated with a layer of Permacel Mylar 22. The two coated sides are joined securely together, as by riveting, for example. The outer surfaces 27 and 28 of cards 25 and 26 are metal coated and the edges fit into the grooves in the inner wall of waveguide 20 and serve as ground planes. The cards are cut back by a V-shaped indentation 29 at the klystron end of waveguide 20 in order to avoid presenting an unfavorable reactance to the klystron.

A pair of miniature diode crystal rectifiers 30 and 31 are connected at their end terminals to the ground plane 27 at 27′ of the printed circuit card 25 of assembly 23. The common terminals 32 are joined at 33 and connected to an internally mounted conducting strip 34 sandwiched between cards 25 and 26 and extending through the waveguide wall to provide the beat frequency output terminal 35.

A novel λ/4 wave plate is provided in the waveguide circuit to circularly polarize the electrical field from the klystron. The λ/4 plate comprises a single rectangular printed circuit card 36 of, for example, fiberglass laminate or some other low-loss material. A small strip of metal 37 is centered on one side of card 33 and is positioned to leave a quarter-wave of bare printed circuit card at either end to serve as a matching quarter-wave step into the metal coated center 37. Card 33 is inserted in grooves in the waveguide wall with its surface inclined 45° with respect to mixer supporting card 23.

Klystron 2 is supported on the input side of waveguide 20 by an output flange 38 provided with a plurality of holes 39 aligned with suitable holes 41 tapped in waveguide 20 for supporting bolts or some other means of securing the elements together. Klystron output flange 38 is provided with a suitable output iris 42 and positioned in alignment with waveguide 20 such that the electromagnetic wave energy propagated out of klystron 2 through iris 42, into waveguide 20, is polarized at right angles to the plane of mixer card 23 and the longitudinal axis of diode crystals 30 and 31. In other words, the klystron 2 feeds into the short section of circular waveguide 20 so that the electromagnetic field is vertically polarized. The metal surfaces 27 and 28 define a horizontal septum which isolates the horizontally polarized reflex waves from the klystron 2. The asymmetrical disposition of the diode structure, defined by diodes 30 and 31 and leads 32 and 33, relative to the equipotential defined by the septum plane, defined by metal surfaces 27 and 28, establishes small components of the transmitted field in the polarization direction of the received field, said components being oppositely directed along the axes of the separate diodes 30 and 31, as shown by the arrows, to provide balanced operation. Also, it is to be noted that the diodes are off the axis of the circular waveguide where the unperturbed transmitted field of the waveguide field also has such components. The mixer diodes 30 and 31 are supported horizontally across the guide, closely adjacent to the metal surface 27 of mixer 23, so that the diodes 30 and 31 couple very little power from the klystron 2 field. Diodes 30 and 31, however, are slightly displaced from the guide center, such that a small amount of the klystron field is coupled (about −15 db).

On the output side of waveguide 20, λ/4 plate 5 is positioned, rotated about the center axis of waveguide 20 on a plane 45° with respect to mixer card 23, as was previously described. λ/4 plate 5 is also positioned 45° with respect to the polarized klystron field. λ/4 plate 5 converts the vertically polarized klystron field into a circularly polarized wave, since the linearly (vertically) polarized wave is split into two perpendicular components, one of which is retarded by a quarter-cycle with respect to the other.

This circularly polarized wave is transmitted into the desired area via an antenna 21, for example, a horn, which is secured to the output side of waveguide 20 by suitable means, for example, a flange similar to flange 38. This radiated energy from the antenna 21 is returned to the antenna 21 as reflected wave energy. The reflected wave energy will be frequency modulated by a moving intruder or foreign object, in accordance with the well-known Doppler theory. Stationary objects located in the area being monitored will reflect energy at the same frequency as the transmitted energy. All reflections are returned as circularly polarized waves with a screw sense opposite to that of the transmitted wave. Upon passing back through antenna 21, the circularly polarized wave is converted by the λ/4 plate 5 into a horizontally polarized field, that is, parallel to the longitudinal axis of diodes 30 and 31. This couples the reflected waves with maximum effectiveness to the horizontally oriented diodes 30 and 31.

The mode pattern of the coupled klystron field which provides the local oscillator excitation will be out-of-phase. That is, the wave energy is coupled in opposite directions to the diodes. The reflected wave energy will be coupled to the two diodes in-phase. Thus, the output from the common junction of the two crystal diodes will provide a signal corresponding to the difference in the crystal diode currents. Since the received fields are in the same direction at each crystal, this signal output from the diodes will have a beat frequency equal to the difference in frequency between the transmitted waves and reflected waves. Thus, a difference in frequency between the received wave energy and the transmitted frequency wave energy is an indication of an intruder or moving object in the area being monitored.

A full and complete disclosure and description of the theory of operation of the mixer-duplexer described in this application is found in copending U.S. application of Richard M. Whitehorn, Ser. No. 862,356, for Waveguide Hybrid Junctions, filed Dec. 28, 1959 (now Patent No. 3,066,290).

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. A microwave hybrid junction comprising; a section of waveguide capable of supporting two orthogonally polarized waveguide modes propagating along the axis thereof; means in said section of waveguide for coupling a pair of diodes to the fields of said modes in such a manner that the energy of the two orthogonal modes is coupled in an in-phase relation into one of said diodes and coupled in out-of-phase relation into the other one of said diodes, a conductive septum member disposed in said waveguide in a plane substantially perpendicular to the polarization direction of one of said modes, said coupling means for both diodes being disposed out of the plane of and being carried from said septum member, whereby coupling to the mode perpendicularly polarized with respect to the plane of said septum is enhanced.

2. The apparatus of claim 1 wherein said septum member comprises a printed circuit board.

3. A mixer-duplexer assembly comprising a hollow waveguide adapted to forwardly propagate a transmitted wave in a given direction, such wave being polarized perpendicular to said given direction and rearwardly propagate a received wave polarized perpendicular to the polarization of said forward wave; a circuit board member disposed in said waveguide in a plane substantially perpendicular to the polarization direction of said forward traveling wave, a pair of crystal rectifiers mounted on said board member and being collinearly disposed parallel to the polarization of said rearward wave, means for perturbing the electric fields in said waveguide to establish electric fields of opposite directions in each crystal rectifier for said forward traveling wave and fields of the same direction in each crystal rectifier for said rearward traveling wave; and means for combining the signals in said crystal rectifiers to produce a beat frequency output.

References Cited

UNITED STATES PATENTS

| | | | |
|---|---|---|---|
| 2,441,598 | 5/1948 | Robertson | 329—161 X |
| 2,810,904 | 10/1957 | Blitz | 343—5 |
| 3,169,224 | 2/1965 | Butson | 325—446 |

ROBERT L. GRIFFIN, *Primary Examiner.*

JOHN W. CALDWELL, *Examiner.*

B. V. SAFOUREK, *Assistant Examnier.*